United States Patent [19]

Blokh et al.

[11] Patent Number: 4,659,058
[45] Date of Patent: Apr. 21, 1987

[54] APPARATUS FOR MANUFACTURING ELASTIC RINGS

[76] Inventors: Leonid Blokh; George Spector, both of 233 Broadway RM 3615, New York, N.Y. 10007

[21] Appl. No.: 656,531

[22] Filed: Oct. 1, 1984

[51] Int. Cl.⁴ .............................................. B29C 13/00
[52] U.S. Cl. ..................... 249/119; 249/155; 249/160
[58] Field of Search ............... 249/117, 119, 155, 122, 249/123, 156; 425/160, 205, 57, 155, DIG. 42, DIG. 47, 182, 190, 195; 277/237 R, 229, 95, 186, DIG. 6, 165, 177; 428/65; 29/450, 451, 235; 403/288 X

[56] References Cited

U.S. PATENT DOCUMENTS

| 451,008 | 4/1891 | Smith | 285/DIG. 19 |
| 736,678 | 8/1903 | Bone et al. | 249/57 |
| 845,668 | 2/1907 | Sweet | 249/156 |
| 2,354,241 | 7/1944 | Anderson | 425/DIG. 42 |
| 2,961,713 | 11/1960 | Hartley | 425/DIG. 42 |
| 3,026,569 | 3/1962 | Keller | 425/DIG. 22 |
| 3,212,177 | 10/1965 | Thomas | 29/450 |
| 3,331,609 | 7/1967 | Moran | 277/165 |
| 3,492,011 | 1/1970 | Gard | 277/237 |

FOREIGN PATENT DOCUMENTS

| 474238 | 10/1937 | United Kingdom | 285/DIG. 19 |
| 668356 | 3/1952 | United Kingdom | 277/165 |

Primary Examiner—Willard E. Hoag

[57] ABSTRACT

A mold for forming an elliptical elastic ring is provided and consists of a pair of plates, each having a mating cavity to form an elastic ring with same circumferential length as a circle of given diameter whereby the mold can be reduced in size in one direction for economic advantages.

1 Claim, 10 Drawing Figures

FIG. 5
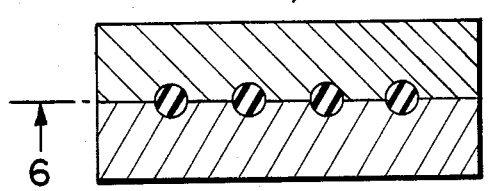
FIG. 7
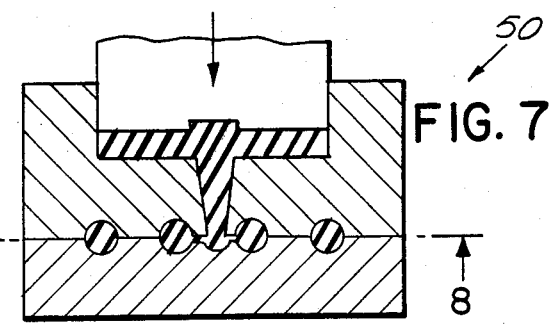
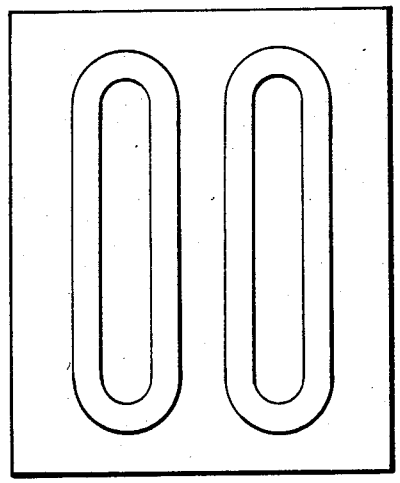
FIG. 6
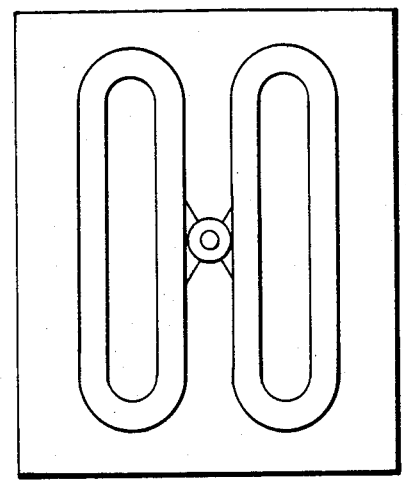
FIG. 8
FIG. 9
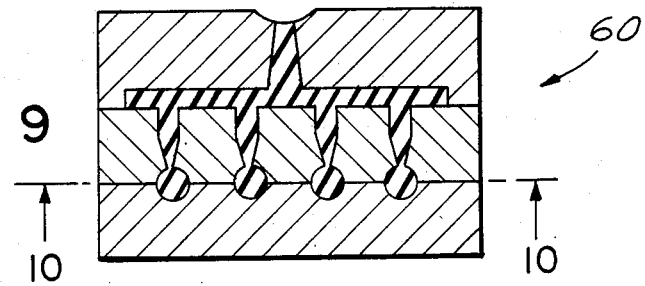
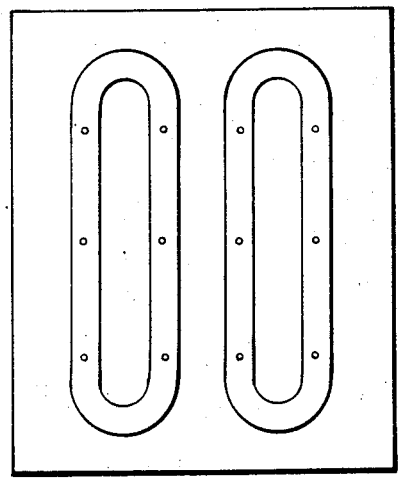
FIG. 10

APPARATUS FOR MANUFACTURING ELASTIC RINGS

BACKGROUND OF THE INVENTION

The instant invention relates generally to molds and more specifically it relates to a mold for forming elastic rings of non circular shape equal in circumferential length of a circle of given diameter.

Numerous molds have been provided in prior art that are adapted to form rings. For example U.S. Pat. Nos. 1,727,312; 2,051,653 and 2,148,079 all are illustrative of such prior art. While these units may be suitable for the particular purpose to which they address, they would not be suitable for the purposes of the present invention as heretofore described.

SUMMARY OF THE INVENTION

A principle object of the present invention is to provide a mold for forming a noncircular elastic ring that has the same circumferential length of a circle of given diameter whereby the mold can be reduced in size or one mold can accommodate a plurality of such rings instead of one circular ring.

Another object is to provide a mold for forming an elliptical elastic ring using any molding process.

An additional object is to provide a mold for forming an elliptical elastic ring that utilizes an insert to form the rings with elliptical cross section.

A further object is to provide a mold for forming an elliptical elastic ring that is simple and easy to use.

A still further object is to provide a mold for forming an elliptical elastic ring that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 5 is a cross sectional view of a compression mold utilizing the invention.

FIG. 6 is a plan view taken along line 6—6 in FIG. 5.

FIG. 7 is a cross sectional view of a transfer mold utilizing the invention.

FIG. 8 is a plan view taken along the line 8—8 in FIG. 7.

FIG. 9 is a cross sectional view of an injection mold utilizing the invention.

FIG. 10 is a plan view taken along line 10—10 in FIG. 9.

DETAILED DESCRIPTION OF THE PREFERRED EMBODIMENTS

Figure 1:
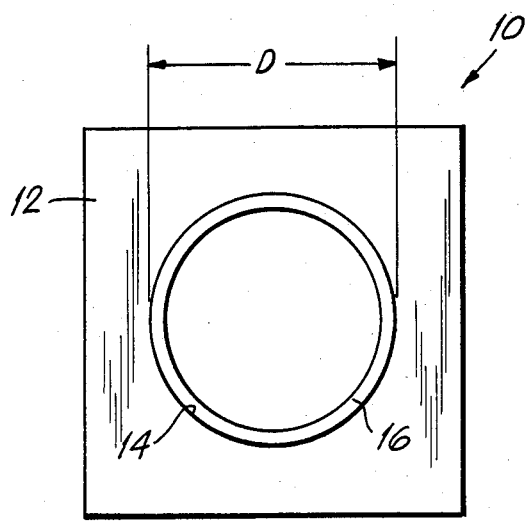
FIG. 1 is a plan view of one half of the prior art mold having one cavity for a circular elastic ring.

Turning now descriptively to the drawings, in which similar reference characters denote similar elements throughout the several views, FIG. 1 illustrates the prior art mold 10 consisting of a pair of plates 12. Each plate 12 has a circular mating cavity 14 to form a circular elastic ring 16. The top plate 12 is removed for clarity.

Figure 2:
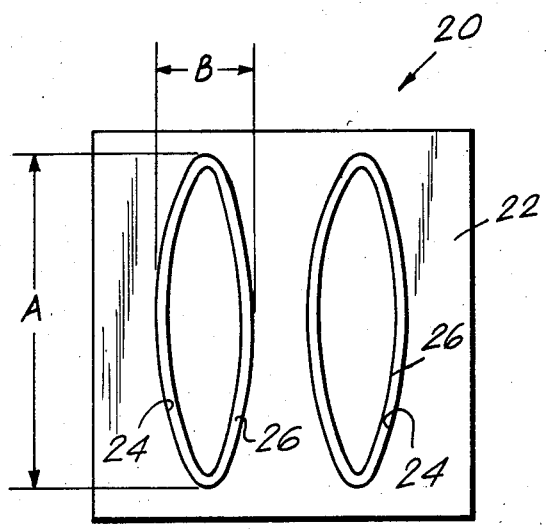
FIG. 2 is a plan view of one half of the invention mold having two cavities for elliptical elastic rings.

In FIG. 2 the invention is a mold 20 consisting of a pair of plates 22. Each plate 22 has an elliptical mating cavity 24 to form an elliptical elastic ring 26 with same circumferential length of the circular elastic ring 16 whereby the mold 20 can be reduced in size. The top plate 22 is also removed for clarity. If each plate 22 is of the same given size as each plate 12 the mold 20 can accommodate two elliptical mating cavities 24, 24 in place of the circular mating cavity 14. Two elliptical elastic rings 26, 26 are thus formed in the mold 20 instead of one circular elastic ring 16 in mold 10.

Figure 3:
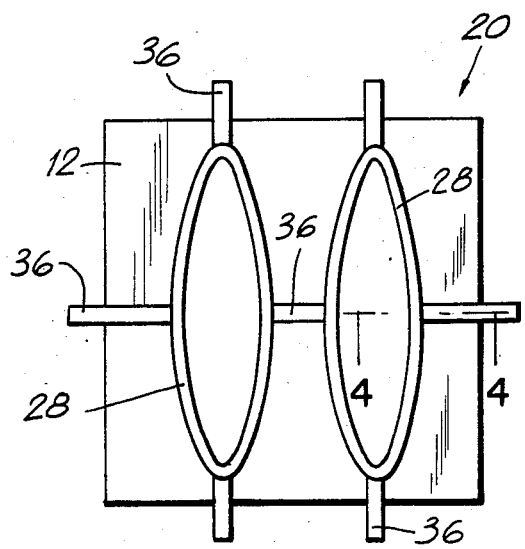
FIG. 3 is a plan view of one half of a modification mold having two cavities for elliptical elastic rings with inserts to form rings with elliptical cross sections.
Figure 4:
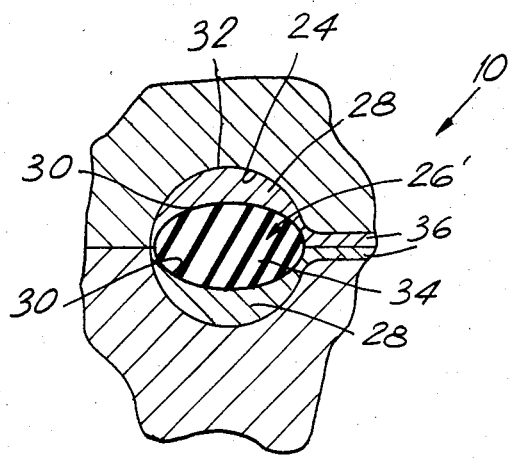
FIG. 4 is an enlarged cross sectional view taken along line 4—4 in FIG. 3.

FIGS. 3 and 4 shows two pair of elliptical inserts 28. Each insert 28 has a half elliptical inner circumference 30 and a half circular outer circumference 32. The outer circumference 32 mates with the mating cavity 24 of the mold 20 so that the inserts form an elliptical elastic ring 26' that has an elliptical cross section 34. Breaking lugs 36 can be provided to aid in separating the inserts 28 from the plates 12 when the rings 26' are to be removed therefrom.

The plates 12 and inserts 28 are fabricated from rigid metal material while the elliptical elastic rings 26 and 26' can be fabricated from pliable plastic or rubber material.

FIGS. 5 and 6 show details of a compression mold 40, FIGS. 7 and 8 show details of a transfer mold 50 while FIGS. 9 and 10 show details of an injection mold 60. Molds 40, 50 and 60 are all various procedures that can utilize the concept of the invention.

The following computations illustrate how the major diameter "A" and the minor diameter "B" are computed for an ellipse in FIG. 2 bearing a circumference equal in length to the circle of given diameter "D" in FIG. 1.

EXAMPLE

To make an elastic ring $D = 1.00$ in.
Length of circumference $L = \pi D = \pi 1 = 3.14$ in.
Area
$$S = \pi \frac{D^2}{4} = \pi \frac{1}{4} = 0.785 \text{ in.}^2$$

If the cavity would have the form of ellipse with ratio $A:B = 5:1$
$A = 2a; B = 2.b'; a:b = 5:1$
Total length (perimeter) of ellipse is $$L = 4a \int_0^{\pi/2} \sqrt{1 - e^2\cos^2\theta'} d\theta$$

$$e = \frac{\sqrt{a^2 - b^2}}{a} \text{ ; after integration}$$

$$L = \pi(a + b)\left[1 + \frac{\lambda^2}{4} + \frac{\lambda^4}{64} + \frac{\lambda^6}{256} + \cdots\right]$$

$$\lambda = \frac{a - b}{a + b};$$

-continued or approximately $$L = \pi[1.5(a + b) - \sqrt{ab}], S = \pi ab.$$

then calculation will give
$a = 0.7385$ in.
$b = 0.1477$ in. and area $S = 0.3425$ in.$^2$
If the cavity would have the form of ellipse with ratio $a:b = 10:1$, the calculation will give
$a = 0.7490$ in.
$b = 0.0749$ in. and area $S = 0.176$ in.$^2$ Summary Table

|  | a or $\frac{D}{2}$ | b or $\frac{D}{2}$ | Length L | Area S | % area |
|---|---|---|---|---|---|
| Ring | 0.5 | 0.5 | 3.14 | 0.785 | 100% |
| Ellipse I | 0.7385 | 0.1477 | 3.14 | 0.342 | 43.5% |
| Ellipse II | 0.7490 | 0.0749 | 3.14 | 0.176 | 22.4% |

The preceeding descriptions relate generally to elliptical rings whereas it should be understood that the same method can be applied to non circular plastic ring shapes which are not elliptical. For example the principle of this invention could be applied to oval shapes such as seen in FIGS. 6, 8 and 10 or compositions of other curves of non elliptical contour.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An elliptical mold for forming an elliptical elastic ring, comprising; a pair of plates, said plates having mating semi-elliptical cavities, each of said cavities being semi-cylindrical in cross section, each of said cavities having an insert mating with semi-cylindrical configuration of the molds forming said cavities, said inserts having mating concavities which together form a mold cavity having elliptical transverse cross-sections taken by passing a plane transversely through said cavity perpendicular to a major or minor axis of the mold cavity and coincident with a minor or major axis of said mold cavity.

* * * * *